US008040570B2

(12) United States Patent
Arthur et al.

(10) Patent No.: US 8,040,570 B2
(45) Date of Patent: Oct. 18, 2011

(54) SYSTEMS AND METHODS FOR PRINT COATING DE-SATURATION

(75) Inventors: Alex M. Arthur, Seattle, WA (US); Erik M. Erikson, Seattle, WA (US)

(73) Assignee: Adapx, Inc., Seattle, WA (US)

( * ) Notice: Subject to any disclaimer, the term of this patent is extended or adjusted under 35 U.S.C. 154(b) by 866 days.

(21) Appl. No.: 11/959,375

(22) Filed: Dec. 18, 2007

(65) Prior Publication Data

US 2008/0141878 A1 Jun. 19, 2008

Related U.S. Application Data

(60) Provisional application No. 60/870,601, filed on Dec. 18, 2006.

(51) Int. Cl.
*H04N 1/40* (2006.01)
(52) U.S. Cl. .................................. 358/3.28; 358/2.1
(58) Field of Classification Search .......... 358/1.9, 358/2.1, 500–504, 515–520, 3.28; 382/162–167
See application file for complete search history.

(56) References Cited

U.S. PATENT DOCUMENTS

| | | | |
|---|---|---|---|
| 6,061,501 A | | 5/2000 | Decker et al. |
| 6,084,689 A | * | 7/2000 | Mo ............................... 358/1.9 |
| 6,535,616 B1 | * | 3/2003 | Hayashi et al. ............... 382/100 |
| 6,873,434 B1 | | 3/2005 | Kohler et al. |
| 7,139,091 B2 | | 11/2006 | Walmsley et al. |
| 2001/0053498 A1 | * | 12/2001 | Fujimoto et al. ........... 430/273.1 |
| 2004/0100658 A1 | | 5/2004 | Kanda et al. |
| 2005/0213119 A1 | | 9/2005 | Clark et al. |

FOREIGN PATENT DOCUMENTS

| | | | |
|---|---|---|---|
| JP | 2003035955 A | * | 2/2003 |
| JP | 2004328115 A | * | 11/2004 |
| JP | 2006119709 A | * | 5/2006 |
| WO | W02005025201 A2 | | 3/2005 |

OTHER PUBLICATIONS

Norrie, M.C., et al., "Print-n-Link: Weaving the Paper Web" Proceedings of the 2006 ACM Symposium on Document Engineering, Oct. 13, 2006, pp. 34-42.
Guimbretiere, F., "Paper Augmented Digital Documents," Internet Citation Nov. 2, 2003, pp. 51-60, url:http://delivery.acm.org/10.1145/970000/964702/p51-guimbretiere.pdf? key1=964702 &key2=4070957121&coll=Guide&CFID=39106926 &CFTOKEN=4, download date of Aug. 1, 2008.

* cited by examiner

*Primary Examiner* — Thomas D Lee
*Assistant Examiner* — Stephen Brinich
(74) *Attorney, Agent, or Firm* — Richard T. Black; Richard C. Vershave; Foster Pepper PLLC

(57) ABSTRACT

Systems and methods for print coating de-saturation. An embodiment of the present invention relates to a method and system for controlling the output of a printer. When content is transmitted to a printer to be printed on a surface with a location-encoding pattern, the pattern is generally printed in a material different from the content material. By way of example, the content is generally transmitted in the CMYK color spectrum. The Key or black value is translated into the CMY values resulting in the K or black value being zero. The system and method alter the C, M, and Y values of the content such that it is ensured that no conversion occurs which would cause the Key color to be used in printing the content. The adjusted output is then sent to the printer.

11 Claims, 4 Drawing Sheets

SYSTEMS AND METHODS FOR PRINT COATING DE-SATURATION

PRIORITY CLAIM

This application claims priority to and incorporates by reference in its entirety U.S. Patent Provisional Application No. 60/870,601 filed Dec. 18, 2006.

BACKGROUND OF THE INVENTION

There are many different types of printers and print services in the market today. All of these printers are controlled with hardware and software that instructs the printer how to print content on a page. These instructions are generally referred to as printer language sets. Examples of printer language sets are Adobe PostScript and Printer Control Language. Any of these instruction sets exploit the characteristics of the printer being used and allows for the control of any brand of printer.

In order to print color onto a page, printers may use any color model in any color-space such as RGB or CMYK; current printers in the marketplace use a full range of colors based on a method called four color process printing. Four color process printing uses three primary ink colors cyan (C), magenta (M), and yellow (Y) plus Key (K) ("CMYK"). Key is generally black in four color process printing. Cyan, magenta, and yellow are the three main pigments used for color reproduction. When these three colors are combined in printing, the result should be a reasonable reproduction of the original, but in practice this is not the case. Due to limitations in the ink pigments, the darker colors are dirty and muddied. To resolve this, a technique called black replacement is used. One method of replacement (black replacement) is to replace highly saturated CMY values with the Key color. An example printer replaces color within a 25% range of theoretical black (fully saturated CMY) with K. This is done to increase the quality of the color, but is also done because black ink is typically less expensive then colored ink.

While black replacement is beneficial for everyday home/home office printing there are several applications in which the detail or intensity of black is important to the user, such as the digital pen industry. In the digital pen industry, the pen generally requires a location-encoding pattern printed on a surface to orient the pen or any other perceiving device having the ability to recognize a qualitative difference between a material used for a location encoding pattern and a material used for content. A surface is generally defined as any printable medium that can accept a print coating, injection, or fusion. By way of example the pattern may be printed with pure black ink, infrared absorbing ink, ultra violet ink or any material that can be distinguished from content material that is detectable by an infrared or other type of sensor in the pen. Content, which is defined as text, a map, images or any printable subject matter, may be placed over the pattern to allow a user with the pen to manipulate the document. If the content is placed over the location-encoding pattern and the content uses black ink (in this case both the content and the pattern using the same material) then the content may interfere with the pattern not allowing the pen to effectively locate itself on the page.

SUMMARY OF THE INVENTION

The present invention relates to a method and system for controlling the output of a printer. As described above when content is transmitted to a printer to be printed on a surface with a location-encoding pattern, the pattern is generally printed in a material different from the content material. By way of example, the content is generally transmitted in the CMYK color spectrum. The Key or black value is translated into the CMY values resulting in the K or black value being zero. The system and method alter the C, M, and Y values of the content such that it is ensured that no conversion occurs which would cause the Key color to be used in printing the content. The adjusted output is then sent to the printer.

In accordance with an aspect of the invention, a computerized readable medium having computer-executable instructions for reducing the output of a Key color from a printer includes receiving output content for printing. The output color of the output content is then adjusted to ensure that non-key colors are not replaced with the key color. The adjusted colors are output to a printer.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENT

When using a digital perceiving device such as a digital pen and a surface configured to accept a print coating such as paper, a location encoding pattern is used to orient the pen on the paper, preferably the location encoding pattern should be printed using a material (such as ink, pigments etc) that is perceivably different from the material used for the content. The graphics, text, etc. (hereinafter referred to as content) should be printed using a material different from the pattern material so that a digital pen can "see through" the content, which may be scanned, drawn, or otherwise overlaid onto the dot pattern. As the pen moves across the boundaries of the "overlaid" content it may become confused if the content is printed using the same material as the location encoding pattern. By way of example and in one embodiment, the pen is generally configured to read a range of black ink on paper using infrared. Thus, the system and methods described herein may operate to selectively print overlaid content onto paper having a location encoding pattern and to print the content in material that is sufficiently different from the material of the location encoding pattern on the paper. By way of example different materials for the pattern and the content may include but are not limited to: the use of colored and/or black ink with invisible infrared ink or with ultra violet absorbing ink.

Methods and systems for print de-saturation are described in further detail below. One embodiment of the invention comprises a series of steps to ensure that output content is printed in a material other then the material used to print a location encoding pattern. The series of steps advantageously override the printers systems that replace colors near to black with black by adjusting the output colors of the output content selected for printing. By way of an example when content is sent to a printer, software adapts the output so that it is configured to print correctly on the printer. In this case the output content is output with its color properties in the CMYK color model. The CMYK color model uses the combination of intensities of these colors to output the correct color on a printer. When the intensity of the colors approach black, typical software tells the printer to print black and as described further below, the methods and systems described herein allows for the content to be printed in a color other than pure black. In an alternate embodiment any color-space may be used such as RGB.

Figure 1:
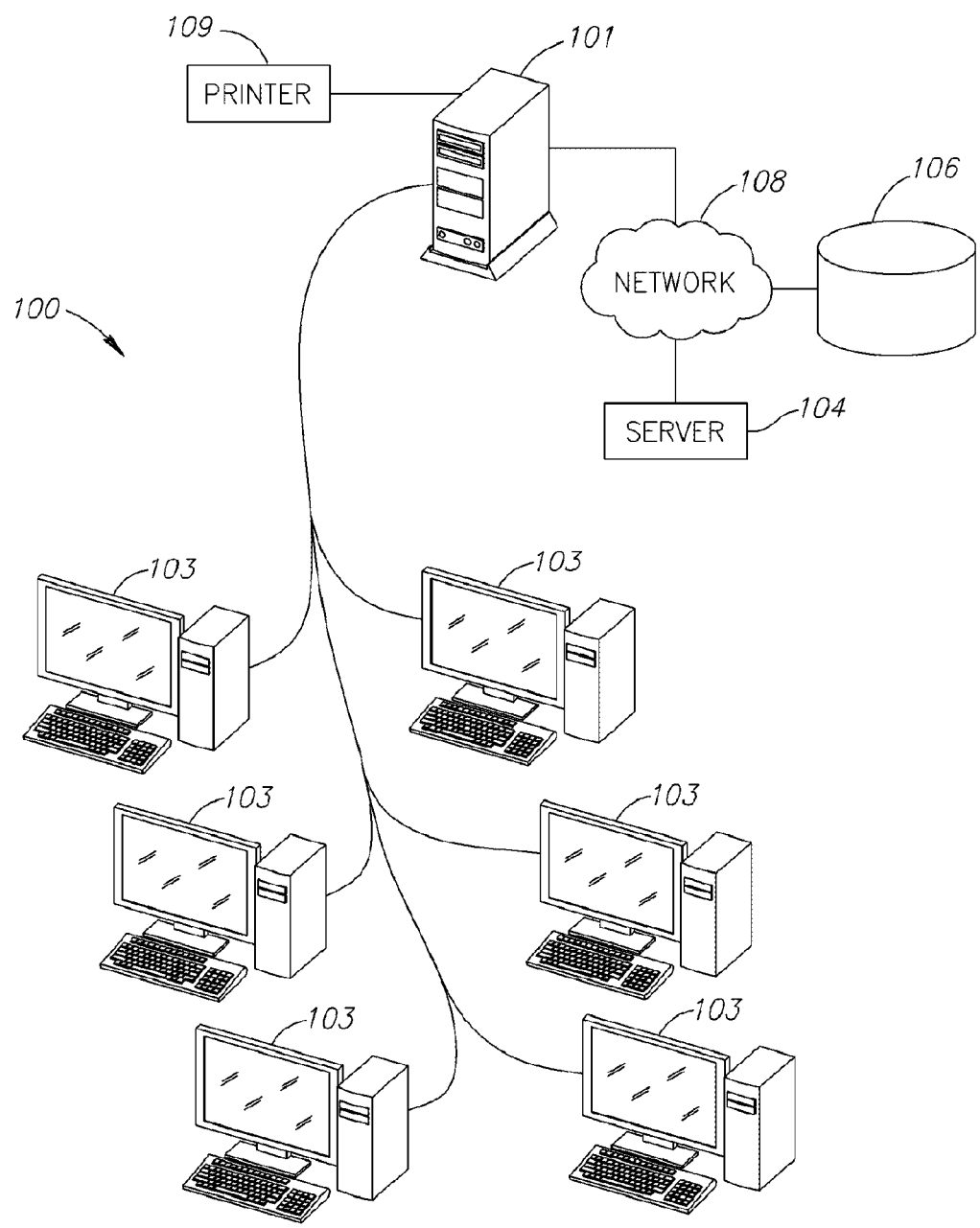
FIG. 1 is a view of a print de-saturation system in one embodiment.

FIG. 1 shows an example system 100 for print de-saturation. In one embodiment, the system 100 includes a computer 101 in communication with a plurality of other computers 103, and a printer 109. In an alternate embodiment, the computer 101 is connected with a plurality of computers 103, a printer 109, a server 104, a data storage center 106, and/or a network 108, such as an intranet or the Internet. Also a bank of servers, a wireless device, a cellular phone and/or another data entry device can be used in the place of the computer 101. In one embodiment, a postscript file stores computer executable instructions for print de-saturation. The postscript file is stored at the data storage center 106 or locally at the computer 101. In an alternate embodiment a printer control language file or a printer instruction set may be used.

In one embodiment, the postscript file, run by the server 104 or computer 101 alters the print output sent to the printer 109. A postscript generation code set contains instructions to be run by a processor in computer 101 or a server 104, alternatively instructions may be stored on the printer 109, such as on board postscript RIP's. The postscript generation code preferably, in one embodiment places "correct" values into a postscript file that is responsible for specifying what to draw and how to draw it. The instructions include separating the selected output content destined for the printer into separate color bands in the CMYK color spectrum. The instructions further include translating the black value to the CMY values resulting in the K value being zero and adjusting the color bands (CMY) using a scaling factor to less than or equal to the predetermined color intensity. The instructions further include outputting the modified output content to the printer 109.

Figure 2:
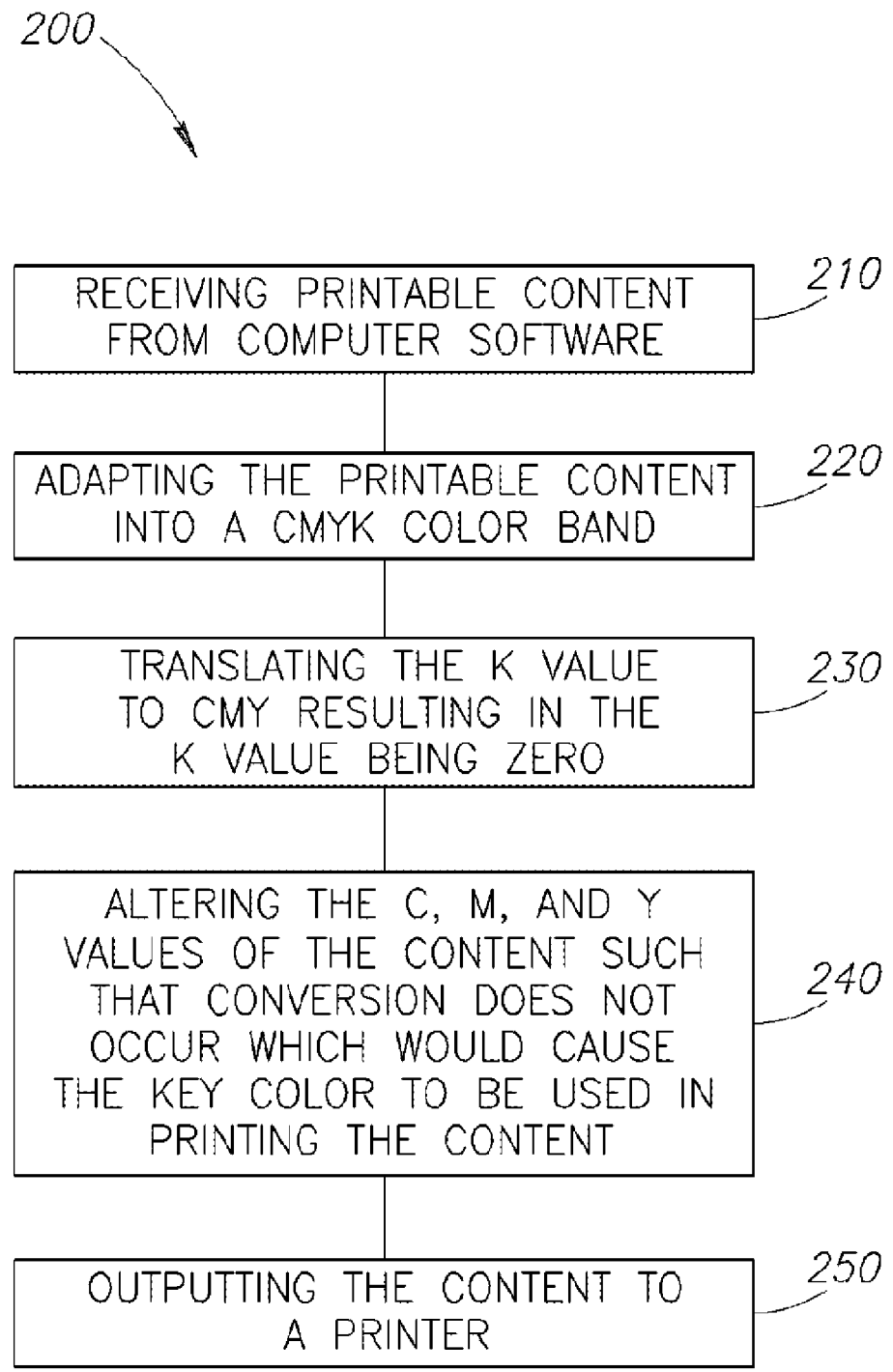
FIG. 2 is a method of using a print de-saturation system in one embodiment.

FIG. 2 is a method 200 of using a print de-saturation system in one embodiment. At step 210, printable content is received from computer; the content is configured for printing on a typical printer. At step 220, the printable content is adapted into the CMYK color model as necessary. The CMYK model is the typical four color printing model and each color printed on the page is made up of a combination of some or all colors in the CMYK color model. At step 230, the value of K or black in one example is translated to the CMY values resulting in the K value being zero. By way of example each dot printed is made up of some or all of the colors and each band of color can be adjusted, therefore allowing the K value to be translated to the CMY values to be separately adjusted. At step 240, the C, M, and Y values of the content is altered such that conversion does not occur which would cause the Key color to be used in printing the content. One method of adjusting the values includes using PostScript files, by invoking the one-operand version of the 'image' command. The command allows the specification of a sample decoding matrix. The default may be to map all samples between 0.0 and 1.0 (the full spectrum). An embodiment of the present invention instead maps samples between 0.0 and some value less than 1.0 (e.g. 0.8). At step 250, the adjusted content is output to a printer.

In one exemplary embodiment, the systems and methods disclosed herein are used when printing a location-encoding pattern on paper for use with digital pen systems. For example when printing infrared-absorbent ink (e.g., carbon-based black) on top of location-encoding pattern, the ink for the content can cover the dots of the pattern, thus hiding the pattern from the infrared sensor in the digital pen. The goal is to reduce the amount of infrared-absorbent ink (e.g., black carbon) used for content, so that the digital pen can locate itself on the paper. As shown above, the systems and methods disclosed herein restrict the CMYK color space for content, but allow the fill CMYK range for the location-encoding pattern (e.g., the dots comprising the location-encoding pattern). The dots can be printed with black carbon ink, whereas the content can be printed with a mixture of cyan, magenta, yellow, and/or, to a lesser degree, black. The result is a reduction in the use of carbon black dots for content, which therefore will not hide the underlying pattern from digital pens.

Figure 3A:
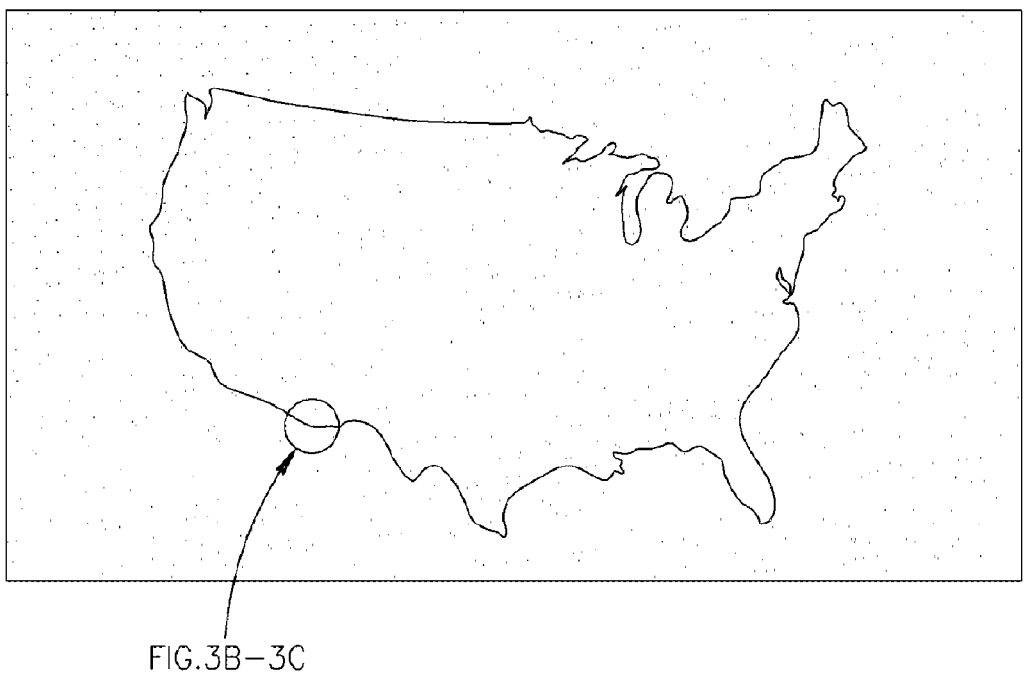
FIGS. 3A-C show examples of the methods and systems for print de-saturation.
Figure 3B:
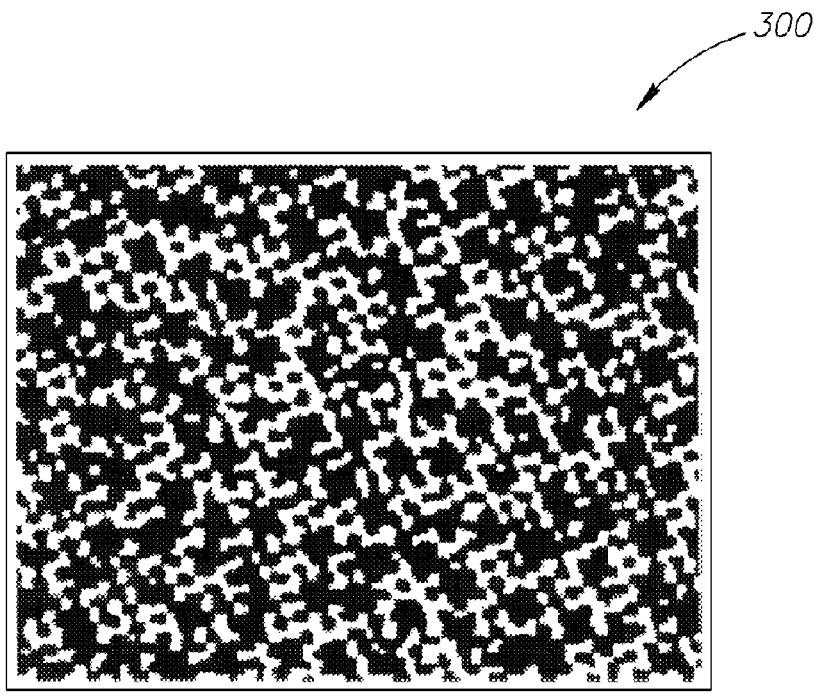
Figure 3C:
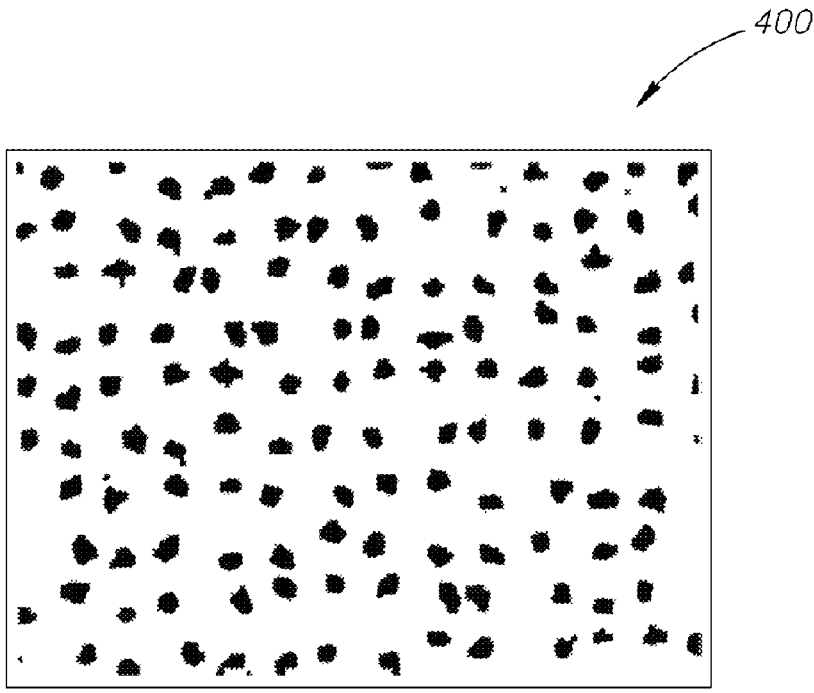

FIGS. 3A-C show examples of the methods and systems for print de-saturation. FIG. 3A shows an example of a paper printed with a location encoding pattern and content. In this case the content is a map of the United States. FIGS. 3B-3C shown an exploded view of the line in 3A from the infrared sensor of a Techkon DMS910 digital microscope taken on the same spot on a piece of paper printed with a black box covering a location-encoding pattern. FIG. 3B does not utilize the technique of an embodiment of the present invention, and thus the same carbon-based black ink is used for the location-encoding pattern and the content. The infrared sensor cannot distinguish them. FIG. 3C shows the output of the same file printed using the technique of an embodiment of the present invention. By restricting the output color space and not printing with the fill spectrum, pure carbon-based black is not rendered in the content. It may be a composition of cyan, magenta, yellow, and/or a small amount of carbon-based black. Therefore, the infrared sensor can distinguish between the composed black in the content and the pure black of the dots. Visually, the composed black looks only slightly faded.

In an alternate embodiment, in order to advantageously ensure that the pattern material is different from the content material, the system and method eliminates one color in the color-space per pixel of the printed content, leaving the remaining colors at their predetermined intensities. For example if using the RGB color-space for the content material and pure black for the pattern material, then in any three neighboring pixels the first pixel has its R value set to zero, the second pixel its G value set to 0 and the third pixel its B value set to zero with this pattern alternating horizontally and vertically ensuring that the content is not printed in black because the RGB combination is below the threshold for black replacement.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method for controlling the material used to print content on a surface having a pattern printed in a different material and thereby being readable by a digital perceiving device, the method comprising:
   translating a K value in a CMYK color-space to the remaining CMY values, resulting in the K value being set to zero;
   adjusting each color band by a scaling factor to less than or equal to a predetermined color intensity;
   printing the adjusted output content, wherein black ink is not used to print content in the output; and printing the pattern, wherein the pattern is printed using infrared absorbing black ink.

2. The method of claim 1, wherein the content is printed in CMY colors.

3. The method of claim 1, further comprising:
printing the adjusted colors and a location-encoding pattern on a printer.

4. The method of claim 1, wherein the content is manipulated in a PostScript file.

5. A non-transitory computerized readable medium having computer-executable instructions for reducing the output of the color black from a printer, comprising:
receiving output content for printing;
scaling each output color in the output content to less than or equal to a color output limit, wherein black ink is not used in the output content;
outputting the adjusted colors to a printer; and
printing the adjusted colors and a location-encoding pattern on a printer, wherein the location-encoding pattern is printed using infrared-absorbing black ink ink.

6. The computerized readable medium of claim 5, wherein the content is printed in CMYK colors.

7. The computerized readable medium of claim 5, further comprising:
printing the adjusted colors and a location-encoding pattern on a printer.

8. The computerized readable medium of claim 5, wherein the content is manipulated in a PostScript file.

9. A system for print de-saturation comprising:
a display; and
a processor in data communication with a display and a printer, the processor comprising:
a first component configured to translate a K value in a CMYK color-space to the remaining CMY values, resulting in the K value being set to zero;
a second component configured to adjust each color band by a scaling factor to less than or equal to the predetermined color intensity
a third component configured to print, on the printer, the adjusted output content, wherein black ink is not used to print the adjusted output content; and
a fourth component configured to print, on the printer, a location-encoding black ink pattern, wherein location-encoding black ink is infrared-absorbing ink.

10. The system of claim 9, wherein the content is printed in CMY colors.

11. The system of claim 9, wherein the content is manipulated in a PostScript file.

\* \* \* \* \*